No. 794,547. PATENTED JULY 11, 1905.
W. T. POFF.
CORN HARVESTER.
APPLICATION FILED MAR. 9, 1904.
2 SHEETS—SHEET 1.
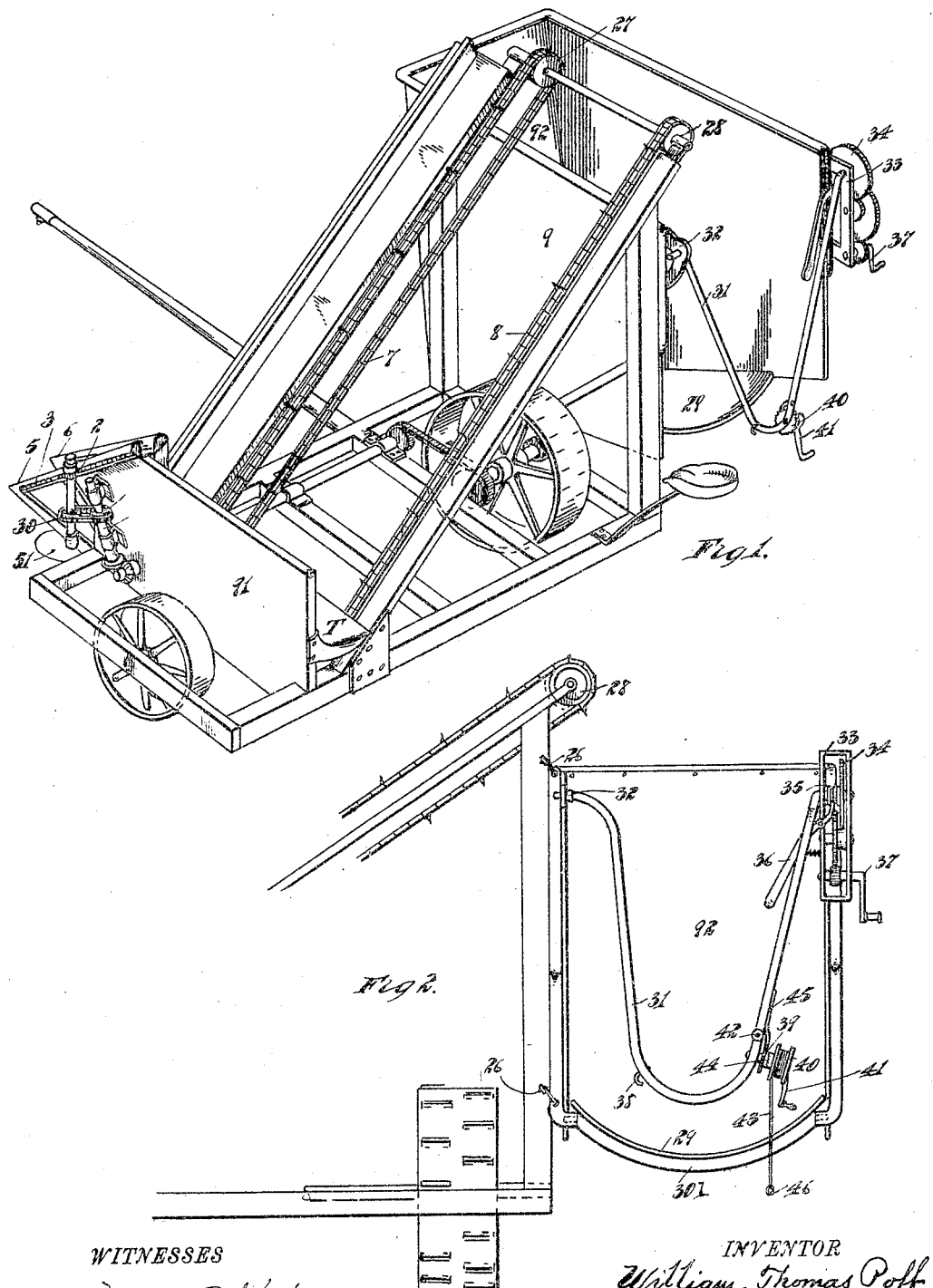
WITNESSES
May E. Kott
J. G. Massey
INVENTOR
William Thomas Poff
By Parker & Burton
Attorneys.

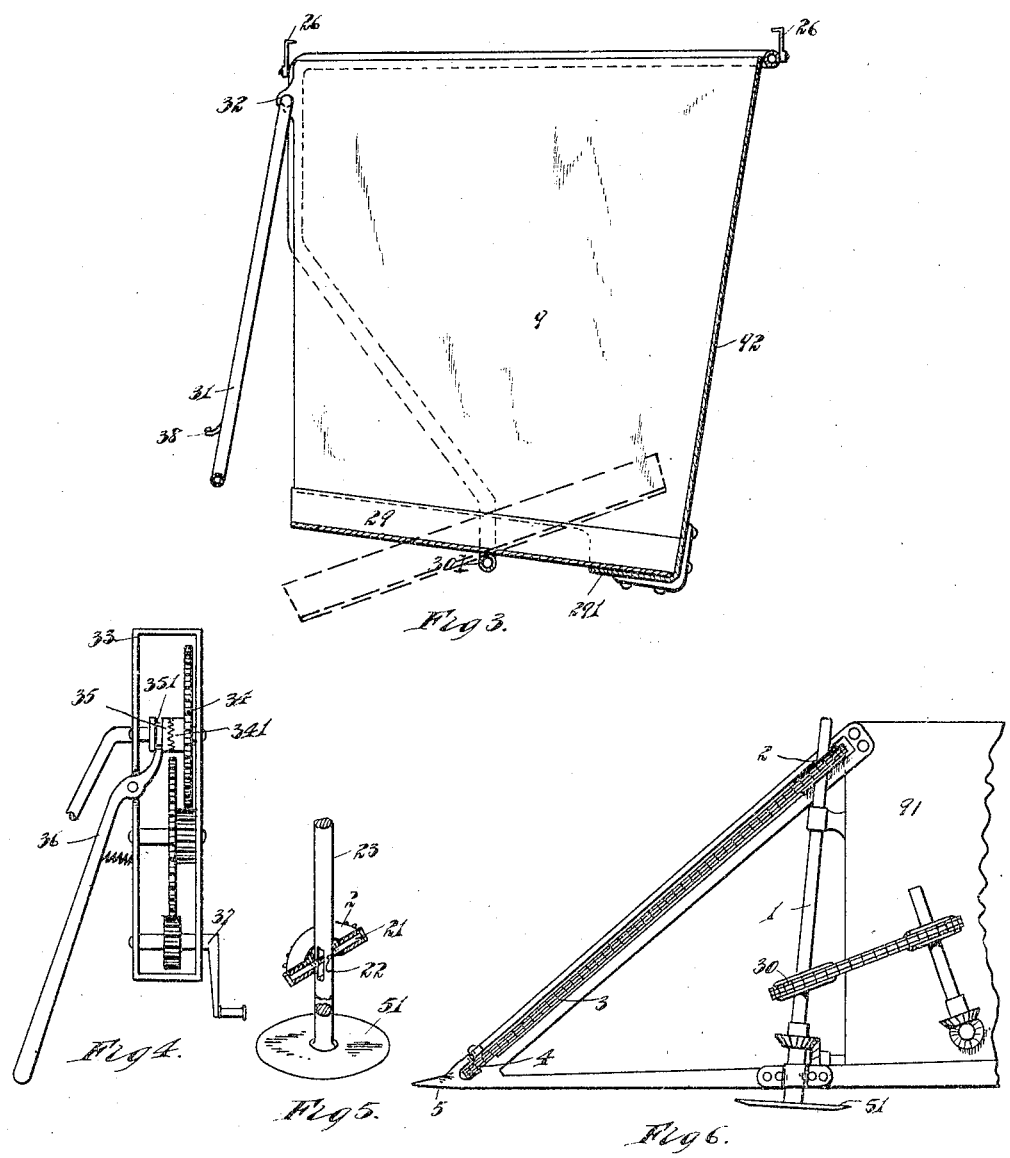

No. 794,547. Patented July 11, 1905.

UNITED STATES PATENT OFFICE.

WILLIAM THOMAS POFF, OF ECKFORD, MICHIGAN.

CORN-HARVESTER.

SPECIFICATION forming part of Letters Patent No. 794,547, dated July 11, 1905.

Application filed March 9, 1904. Serial No. 197,278.

*To all whom it may concern:*

Be it known that I, WILLIAM THOMAS POFF, a citizen of the United States, residing at Eckford, county of Calhoun, State of Michigan, have invented a certain new and useful Improvement in Corn-Harvesters; and I declare the following to be a full, clear, and exact description of the invention, such as will enable others skilled in the art to which it pertains to make and use the same, reference being had to the accompanying drawings, which form a part of this specification.

This invention relates to corn-harvesters, and has for its object improvements in that class of corn-harvesters in which the cutting mechanism is mounted on wheels and drawn by horses and in which the severed stalks are taken by a conveyer and delivered in a receptacle in which they accumulate until a quantity sufficient for a shock has been delivered thereinto, and the shock is then bound by the operator, using for that purpose a manually-actuated compressor, after which the shock is set upright and dropped upon the ground.

In the drawings, Figure 1 is a perspective of the entire machine. Fig. 2 is a rear end elevation showing the carrying mechanism in which the stalks are accumulated and from which they are finally dropped as a finished shock. Fig. 3 is a longitudinal section of the shock-carrier. Fig. 4 is a detail of the mechanism used to upright the shock and drop it from the carrier. Fig. 5 is a detail of a wheel-mount used in connection with the pilot. Fig. 6 is a detail of the pilot and the belting connected therewith which is used to direct the stalk back to the elevating-belt.

The corn is cut by horizontal cutter-wheels, of which one is seen in Fig. 1, and the same wheel is again seen in Fig. 6. These are shearing-wheels that are in common use for severing stalks, and neither they nor their driving mechanism need be particularly described, as they form no part of the present invention. They are mounted on nearly-vertical shafts, and to the top end of the outer shaft 1 is secured a wabble-wheel 2 with sprocket-teeth on its periphery, and a toothed sprocket-chain 3 engages the wabble-wheel 2 and engages a sprocket-chain 4 at the nose of the pilot. This sprocket-chain serves as a guide or driving chain to engage stalks that have entered between the points of the two pilots 5 and 6 and serves to carry the stalks back to the table 7, from which they drop on the carrying-belts 7 and 8 and are carried over the side wall 9 of the shock attachment.

The wabble-wheel 2 in place of a hub has an opening through its center, and across the opening and along a diameter of the wheel is a shaft 21. At the middle point of the shaft 21 is a cross-shaft or pair of trunnions 22. The trunnions 22 engage in bearings in the wheel-support, which in this case is the shaft of the cutter-knife 51. The shaft 23 is provided with a slot 24, through which the shaft 21 engages loosely, so loosely that it may swing through a considerable variation of angle to the axis of the shaft 23. The body of the wheel oscillates on the shaft 21, and in order that it may have a range of oscillation the hole through the wheel is larger than the outside diameter of shaft 23. The construction is analogous to a well-known form of a so-called "universal joint," in which each part is capable of turning or oscillating with respect to the other. With this construction the rotation of the wheel produces a rotation of the shaft 23, or, on the contrary, the rotation of the shaft produces a rotation of the wheel and the compound swinging motion of which the one part is capable with respect to the other enables the wheel to maintain a position of inclination to the shaft, and at the same time the shaft may rotate on its longitudinal axis. A similar wabbling-wheel 30 is introduced as a part of a driving mechanism of a cutter-shaft 1.

The shock attachment is made as a detachable box-like structure provided with securing devices 26, by means of which it is held to the uprights that sustain the high part of the elevator-frame over which the elevator-chains 7 and 8 are carried on sheaves 27 and 28, that are journaled on the upper end of the frame. The shock attachment has its two side walls and its front end closed in. The top and rear end are open. The bottom is provided with a tilting drop 29, preferably somewhat concave, with the cavity upward, and arranged to swing on a trunnion-bar 301, journaled in the side framing of the carrier. A bail-like structure 31 is pivotally connected to the carrier at the rear thereof and near the upper edges and extends across the carrier with a bent loop which during the gathering of the stalks hangs in the position shown in Figs. 1 and 2. One end of the bail is pivoted in an ear 32, and the opposite end of the bail is pivoted in a bracket 33, which furnishes two bearings or yoke-pieces for this end of the bail. Between the bearings and inside the yoke-pieces of the bracket is a gear-wheel 34, loosely journaled on the bail. A clutch 35 is arranged on the end of the bail to have axial motion thereon and is arranged to rotate with the bail. This is provided with a circumferential ring 351, in which engages the fork of a lever 36, that is pivotally supported on the bracket 33. The hub of the wheel 34 is provided with a clutch 341, arranged to engage with the clutch 35. The bracket 33 also supports a chain of gearing ultimately driven by a crank 37. By actuating the crank the bail is slowly rotated in its bearings with considerable force, force sufficient to lift a heavy shock of corn. Near the turn of the bail it is provided on one side with a hook 38 and on the other side with a spindle 39, on which there are a spool 40 and a crank 41. The bail is also provided with a small sheave 42, employed to change the direction of the cord used for compression purposes. A cord 43 is secured to the spool. On the shaft of the spool is a clutch-like pawl 44, which engages with suitable clutch-teeth on the hub of the spool and is held in engagement by a spring 45. The clutch engagement between the pawl and the spool is broken manually.

The bottom 29 of the carrier is arranged to tilt to lower its rear end. The forward end engages against a stop 291, which prevents that end from dropping. The entire carrier is made detachable from the frame of the cutter for convenience of transportation passing through gates and into barns and sheds and for storage purposes or for any other reason that may make it desirable to at times detach the carrier from the cutter.

In operation the cutter is drawn by horses, with the two pilots 5 and 6 straddling the row of corn that is to be harvested. As the harvester progresses the corn is cut and is directed backward with the stalks parallel and dropping regularly on the carrier behind the front guard or abutment 91. The stalks are lifted by the belts and dropped into the attachment with the butts of the stalks engaging against the end 92 of the shock attachment and resting partly on the tilting bottom 29 and partly on the loop of the bail. When a sufficient quantity to form a shock of the desired size has been gathered, the workman places a ring 46 at the end of the cord 43 over the hook 38, with the cord lying over the stalks. He next winds the cord on the spool 40 until he has produced the desired amount of compression of the shock and binds the shock with any suitable material. Then before removing the compressor the workman swings the bail and the shock of corn which is now bound to it backward and upward, turning the crank 37 to produce this result. As the shock straightens up the bottom 29 tilts downward and the bottom of the shock swings vertically below the end of the bail, which is now directed backward in a horizontal or approaching a horizontal position, and the workman then lowers the shock to the ground. He may lower it quickly by unclutching the clutches 35 and 341 and may, if it be necessary, raise and lower it quickly or suddenly several times until he is satisfied that it will maintain its position securely. He next disengages the compressor, which leaves the bail free to swing up over the top of the shock, which motion may be accomplished quickly by disengaging the clutches and swinging the bail manually upward and forward, after which the tilting bottom and the bail automatically assume their proper position for succeeding action.

What I claim is—

1. In a corn-harvester, in combination with means for cutting and gathering cornstalks, a vertically-swinging bail adjacent to the delivery end of said gathering means, and means for supporting said bail, substantially as described.

2. In a corn-harvesting machine, in combination with means for cutting and delivering severed cornstalks, a receptacle in which to gather the stalks, a bail swinging across one end of said receptacle, and compressor mechanism secured to said bail, substantially as described.

3. In a corn-harvester, in combination with means for cutting and gathering cornstalks, a receptacle into which to deliver said stalks, a swinging bail at one end thereof, means for holding the stalks to said bail, and means for swinging said bail, substantially as described.

4. In a corn-harvester, in combination with means for cutting and gathering cornstalks, a receptacle into which to deliver and carry cornstalks, a swinging bail at one end thereof, means for compressing the stalks in the loop of said bail, means for swinging the bail on its pivots, and a clutch mechanism for engaging and disengaging the swinging means, substantially as described.

5. In a corn-harvester, in combination with means for cutting and gathering cornstalks, a receptacle into which to deliver said stalks, a pivoted hanging bail at the rear of said receptacle arranged to hang with a looped portion in position to receive the stalks delivered thereinto, a train of gearing mounted at the side of said receptacle; clutch mechanism between the last wheel of said train of gearing and the pivot on which said bail swings, and a compressor mechanism secured to said bail, substantially as described.

6. In a corn-harvester, in combination with means for cutting and gathering corn, a receptacle into which to deliver the stalks, a tilting bottom to said receptacle, a swinging bail at one end thereof, means for holding the stalks to said bail, and means for swinging said bail, substantially as described.

7. In a corn-harvester, in combination with means for cutting and gathering cornstalks, a receptacle into which to deliver and carry corn, a tilting bottom to said receptacle, a swinging bail at one end thereof, means for compressing the stalks in a loop of said bail, means for swinging the bail on its pivots, and a clutch mechanism for engaging and disengaging the swinging means, substantially as described.

8. In a corn-harvester, in combination with means for cutting and gathering cornstalks, a receptacle into which to deliver said stalks, a tilting bottom to said receptacle, a pivoted hanging bail at the rear of said receptacle arranged to hang with a looped portion in position to receive the stalks delivered thereinto, a clutch mechanism adapted to control the movement of said bail, a train of gearing mounted at the side of said clutch mechanism between the last wheel of said train of gearing and the pivot on which said bail swings, and a compressor mechanism secured to said bail, substantially as described.

9. In a corn-harvester, in combination with means for cutting the stalks, a plurality of endless belts, a suitable supporting-frame, means for driving said belts, a receptacle with a tilting bottom for the stalks, a swinging bail attached thereto and means for swinging the bail, substantially as described.

In testimony whereof I sign this specification in the presence of two witnesses.

WILLIAM THOMAS POFF.

Witnesses:
AGNES M. STERLING,
D. W. KNICKERBOCKER.